Sept. 20, 1971  R. M. KATIMS  3,606,514
CONTAINER FOR TRANSPORTING VEHICLES
Filed June 16, 1969

INVENTOR
RONALD M. KATIMS

BY *David Rabin* attorney

United States Patent Office 3,606,514
Patented Sept. 20, 1971

3,606,514
CONTAINER FOR TRANSPORTING VEHICLES
Ronald M. Katims, 10 Clydesdale Road,
Scotch Plains, N.J. 07076
Filed June 16, 1969, Ser. No. 833,521
Int. Cl. A47b 97/00
U.S. Cl. 312—352                                8 Claims

ABSTRACT OF THE DISCLOSURE

A box-like container for transporting vehicles secured therein and capable of being stacked in interlocked, superposed relation with containers of various lengths. Doors have been provided along the container side wall and positioned to correspond with the driver door of each vehicle secured within the container for providing access to and from the vehicles.

BACKGROUND OF THE INVENTION

The present invention relates to a container adapted to be mounted on a highway truck-trailer chassis, railway flat car, or the like, and to be detached therefrom and stowed in or on a ship for marine transportation. General freight containers of this type are disclosed in U.S. Pat. Nos. 3,085,707 and 3,042,227. The containers disclosed in the above-referred to patents are similar to a truck-trailer type body having a fixed roof with doors in the rear end wall for loading and unloading freight. Such containers are adequate for many types of freight but will not accommodate certain large bulky cargo, such as automobiles or other vehicles, because of their length limitations and necessary width required within the container for providing ingress and egress of a driver to and from a vehicle within such containers. Normally such containers are of a length insufficient to permit two automobiles to be placed therein, lengthwise.

SUMMARY OF THE INVENTION

The present invention provides a container of a length sufficient to accommodate two automobiles in end-to-end relation and of a height to receive therein automobiles in stacked relation. Vertically spaced pairs of tracks, one pair adjacent the base platform of the container and the other pair positioned approximately midway between the top wall and base platform of the container, are provided for receiving automobiles thereon. Cars are driven onto the tracks through the doorway provided by conventional hinged doors, at the rear of the container. Due to the present legal limits which preclude the use of a container more than 96 inches wide for highway use, the limited widths of the container pose problems in providing access to and from the vehicles by the operators that drive and position the automobiles within the containers.

An important feature of this invention is the provision of doors spaced along at least one container side wall in parallel relation so as to substantially coincide with the driver's door of each automobile for convenient access to the automobiles by a driver as they are loaded within or unloaded from the containers.

Principal objects of this invention are concerned with providing containers, adapted to receive a plurality of automobiles therein, which are capable of being stacked in superposed relation directly upon each other in substantial numbers within or on a large sea-going vessel.

Conventional standard containers have a length of approximately 35 feet with support points or pick-up points at the corners thereof. Heavy castings or plates are provided at each of the eight corners of the container. Upstanding posts are secured to associated pairs of upper and lower castings. The corner castings are so related to the posts and to the container top, side, and end walls that the containers can be stacked one on another with all the load of the containers being taken by the corner castings and posts. Openings or sockets are provided in the corner castings or plates to facilitate interlocking of the containers with suitable conventional lifting means for transferring the containers from a flat car or trailer chassis to a ship, and vice versa. The openings also facilitate the positioning and securing together of the containers in stacked relation. However, since the length of the standard 35-foot containers are inadequate to receive two automobiles therein in end-to-end relation, it has been found advantageous to increase the container length by approximately three feet to adequately receive the automobiles. In order to stack the extended length containers of approximately 38 feet in length with the standard 35-foot containers or with other containers of various lengths, as disclosed in co-pending application Ser. No. 831,057, filed on June 6, 1969, so that the support points of each can be aligned, it has been found desirable to space the rear support points of the elongated container inwardly from the rear wall such that the supports remain at 35 centers. By so positioning the support points at 35-foot centers, it is possible to utilize existing container lifting systems for transferring the containers.

DETAILED DESCRIPTION OF THE INVENTION

Figure 1:
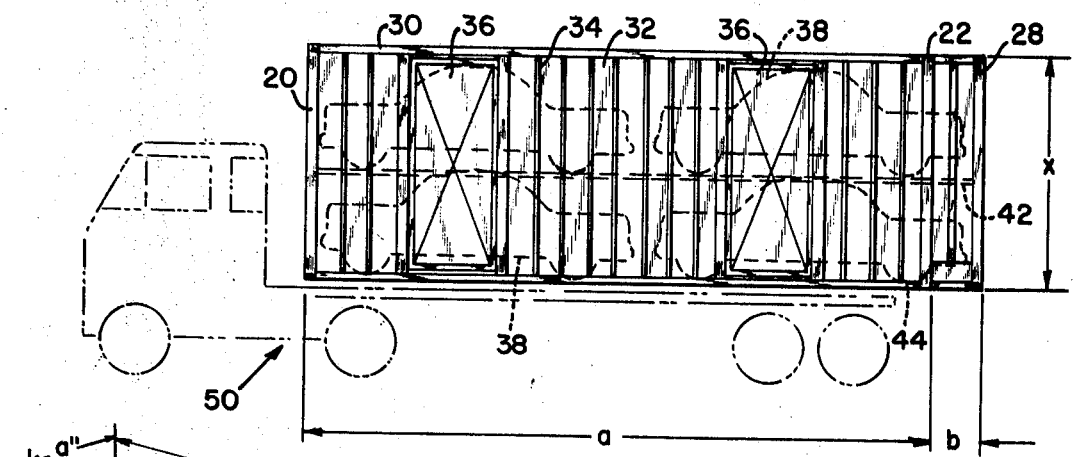
FIG. 1 is a side elevational view of the container of the present invention positioned on a conventional tractor-trailer arrangement.
Figure 2:
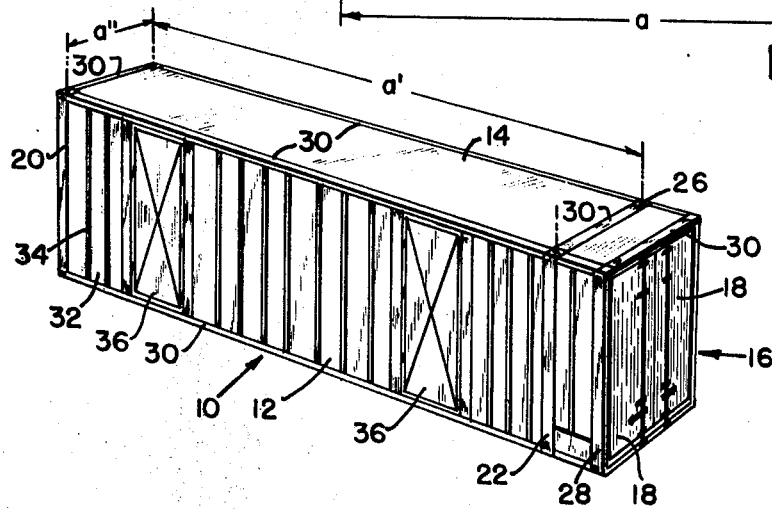
FIG. 2 is a perspective view of the oversized container illustrating the support and pick-up points, and the rear and side doors.

The container body 10 shown as comprising a pair of side walls 12, a top wall 14, a rear wall 16 including a pair of hinged, outwardly opening doors 18 and a front end wall 19, are supported upon a platform base 15 having longitudinally spaced end portions. A pair of front corner posts 20 and a pair of posts 22 spaced from the rear wall 16, have castings 24 secured thereto at each end thereof. The castings 24 and posts 20, 22 are similar in construction to those disclosed in the above-referred to patents. The castings and posts receive the full load of all containers mounted thereabove in stacked relation.

The castings, not shown, secured to the lower ends of posts 20, 22 extend to a horizontal plane lower than any other part of the container so that they alone will make contact with the top castings of a subjacent container in a stack, and they are shaped to engage coupling means, not shown, for securing the container in place with respect to a vessel or vehicle trailer or to another container mounted therebelow. A convenient means for effecting this coupling is to provide an opening or socket in the bottom castings for receiving a rotatable pin or post having laterally projecting lugs thereon.

The top castings 24 are similarly provided with openings or sockets 26 to facilitate interlocking lifting lugs of conventional lifting systems for transferring the container to and from a ship or to facilitate the securing together of the containers in stacked relation.

Additional corner posts 28 are provided at the juncture of the rear and side walls. All support posts 20, 22 and posts 28 are connected at their bottom, top, and sides by rails or sills 30 as is usual in trailer or container constructions, and the front and side walls of the container are formed of sheet metal panels 32 stiffened by vertical ribs 34.

Figure 3:
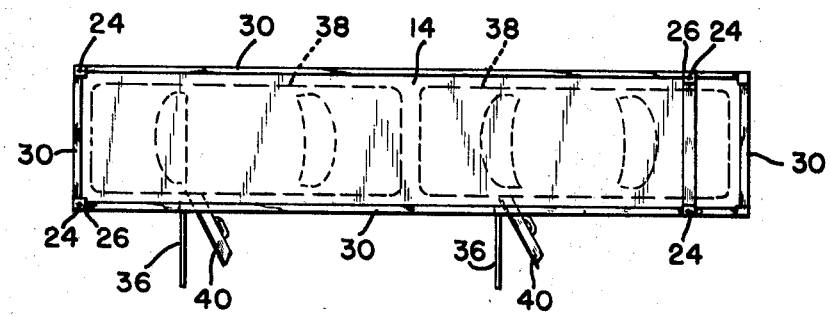
FIG. 3 is a top plan view of the container with the side doors in opened position and illustrating automobiles positioned therein.
Figure 4:
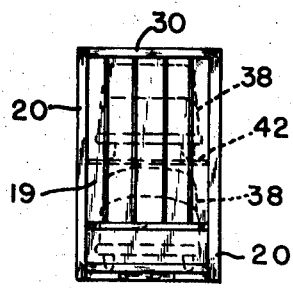
FIG. 4 is an end view of the container illustrating automobiles positioned therein in vertically spaced relationship.

A plurality of doors 36 are provided in side walls 12 for providing access to vehicles 38, shown in broken line configuration in FIGS. 1, 3 and 4. The doors 36, which extend substantially the full height of side wall 12, are hingedly mounted to said side wall intermediate support posts 20, 22 in spaced, parallel relation. As shown by FIG. 3, the container doors 36 are situated to correspond with the driver's door 40 of vehicles secured within the container.

Tracks 42, 44, which extend the full length of the container, are positioned for receiving automobiles thereon. Lower track 44 is located adjacent the container base platform and the upper track 42 is secured by suitable means approximately midway between the top and bottom walls of the container. The vertical distance $x$, see FIG. 1, between tracks 42, 44, and between track 42 and the top container wall 14, is sufficient such that a plurality of automobiles can be received and secured within the container in stacked relationship as shown by FIGS. 1 and 4.

FIG. 1 illustrates the container 10 mounted on a conventional highway tractor-trailer arrangement 50, shown in broken lines. The letter $a$, FIG. 1, represents the length of standard 35-foot containers, and $a$ represents the distance between the container support posts 20, 22, which receive the full load of a standard size container supported thereabove in superposed relationship when positioned on a ship. Letter $b$ represents the length of a cantilevered portion of the container 10 extended to accommodate vehicles in end-to-end relation therein. The load distributed within the 38-foot container is substantially equal to that within a 35-foot unit, since any load in the three foot cantilevered portion $b$ will only reduce the bending moments in the container as the container is lifted by conventional lifting means releasably connected to the upper castings or plates 24.

I claim:

1. Freight handling apparatus comprising a body for stacking interchangeably in superposed relation with other bodies, said body including a rectangular platform base for supporting freight thereon having a predetermined length and longitudinally spaced end portions, and means for facilitating lifting of said body and supporting said body in stacked relation with other bodies, said means including a first vertically extending frame positioned at one of said rectangular platform base end portions and a second vertically extending frame substantially spaced from the other of said rectangular platform base end portions intermediate said end portions, said second vertically extending frame defining a cantilevered portion of said container extending from said second frame when said container is supported by a lifting mechanism or is supported in stacked relation with other containers.

2. Freight handling apparatus of claim 1, said means including upper and lower castings whereby a plurality of said bodies may be mounted upon each other with the weight of the upper bodies borne exclusively by the castings.

3. Freight handling apparatus of claim 2, said body including front, rear, side and top walls forming a box-like container, said rear wall including a hinged door mechanism providing access to the container.

4. Freight handling apparatus of claim 3, including vertically spaced support structures positioned within said container for supporting vehicles therein in superposed relation.

5. Freight handling apparatus of claim 4, wherein said box-like container is of sufficient length to accommodate at least two vehicles in end-to-end relation and of a sufficient height to receive at least two vehicles on said vertically spaced structures in stacked relation.

6. Freight handling apparatus of claim 5, and means provided in at least one side wall for providing direct access to each vehicle positioned within said container.

7. Freight handling apparatus of claim 6, said access means including at least one pivotably mounted door provided in said one side wall, and positioned to coincide with the driver's door of a vehicle positioned therein.

8. Freight handling apparatus of claim 7, wherein each pivotally mounted door extends substantially the full height of said container side walls to provide access to all vehicles within a prescribed stack of vehicles.

References Cited

UNITED STATES PATENTS

| | | | |
|---|---|---|---|
| 2,524,260 | 10/1950 | Hutson | 206—46X |
| 3,081,120 | 3/1963 | Heinmiller et al. | 280—1A |
| 3,413,016 | 11/1968 | Bertolini | 280—1A |
| 2,695,568 | 11/1954 | Keith | 105—368 |
| 2,924,344 | 2/1960 | Moore | 214—75 |
| 2,956,517 | 10/1960 | Chapman et al. | 105—368 |
| 3,043,454 | 7/1962 | Butler | 214—75 |
| 3,382,998 | 5/1968 | Turpin | 220—1.5 |

JAMES T. McCALL, Primary Examiner